(12) United States Patent
Botella et al.

(10) Patent No.: US 10,871,221 B2
(45) Date of Patent: Dec. 22, 2020

(54) SHIFT BY WIRE GEAR SHIFT ACTUATOR

(71) Applicant: FICO TRIAD, S.A., Barcelona (ES)

(72) Inventors: Marc Dominguis Botella, Barcelona (ES); Jaume Ferre Ripoll, Barcelona (ES)

(73) Assignee: FICO TRIAD, S.A., Barcelona (ES)

( * ) Notice: Subject to any disclaimer, the term of this patent is extended or adjusted under 35 U.S.C. 154(b) by 264 days.

(21) Appl. No.: 15/927,812

(22) Filed: Mar. 21, 2018

(65) Prior Publication Data
US 2018/0274665 A1  Sep. 27, 2018

(30) Foreign Application Priority Data

Mar. 21, 2017  (EP) ..................................... 17382142

(51) Int. Cl.
| | | |
|---|---|---|
| *F16H 59/08* | (2006.01) | |
| *F16H 63/48* | (2006.01) | |
| *F16H 63/34* | (2006.01) | |
| *F16H 63/42* | (2006.01) | |
| *F16H 61/22* | (2006.01) | |
| *F16H 59/02* | (2006.01) | |

(52) U.S. Cl.
CPC ......... *F16H 59/08* (2013.01); *F16H 63/3491* (2013.01); *F16H 63/42* (2013.01); *F16H 63/48* (2013.01); *F16H 2059/0295* (2013.01); *F16H 2059/081* (2013.01); *F16H 2061/223* (2013.01); *F16H 2063/423* (2013.01)

(58) Field of Classification Search
CPC ............... F16H 59/08; F16H 2059/081; F16H 2059/0295; F16H 2061/223; F16H 63/3491; F16H 63/42; F16H 63/48; F16H 2063/423

See application file for complete search history.

(56) References Cited

U.S. PATENT DOCUMENTS

2015/0152958 A1* 6/2015 Watanabe ............... F16H 61/22
                                                          74/473.12

FOREIGN PATENT DOCUMENTS

| | | |
|---|---|---|
| EP | 2963314 A1 | 1/2016 |
| WO | 2011143178 A2 | 11/2011 |

OTHER PUBLICATIONS

European Search Report for Application No. 17382142.2, dated Aug. 31, 2017, 9 pages.

* cited by examiner

*Primary Examiner* — Huan Le
(74) *Attorney, Agent, or Firm* — Brooks Kushman P.C.

(57) ABSTRACT

The shift by wire gear shift actuator includes a selector knob rotatable by the user for selecting a gearshift position for controlling a vehicle transmission, and a display arrangement associated with the selector knob for sequentially and dynamically providing optical indications according to gearshift positions simulating a rotational movement of the selector knob. This informs the user about an auto park feature when the vehicle transmission is being automatically driven into a park gearshift position under a determined condition such as for example when a person intends to exit the car, when the vehicle is turned off, when the driver's door is open with the safety belt unlatched, etc.

20 Claims, 2 Drawing Sheets

SHIFT BY WIRE GEAR SHIFT ACTUATOR

CROSS-REFERENCE TO RELATED APPLICATIONS

This application claims priority to EP Application Serial No. 17382142.2 filed Mar. 21, 2017, the disclosure of which is hereby incorporated in its entirety by reference herein.

TECHNICAL FIELD

The present disclosure relates to shift by wire gear shift actuators and specifically to shift by wire gear shift actuators comprising a selector knob that can be rotated by a user for selecting one of a number of gearshift positions for controlling a vehicle transmission.

The present disclosure further relates to a shift by wire gear shift device that comprises the actuator. A method is also disclosed herein for informing a user that a vehicle transmission is being automatically driven into a park gearshift position when a determined condition is met.

BACKGROUND

Rotatable selector mechanisms for motor vehicle transmissions actuated by shift-by-wire are known in the art including a rotary actuator. The rotary actuator is adapted to be rotated by the driver in order to select different operating gearshift positions of the transmission such as Park (P), Reverse (R), Neutral (N) and Drive (D).

As the rotary actuator is rotated by the driver, a control signal indicating a desired operating gearshift position is transmitted through a control unit for controlling the vehicle transmission.

Safety means are also provided for warning users to always select park before exiting the vehicle. These may for example include means for outputting warning messages and sounds when a door is open and the vehicle is not in park. However, it has been found that drivers still exit the vehicle without checking to ensure that the park position has been selected, thus jeopardizing their safety.

In order to alleviate this problem, recent shift-by-wire transmissions in motor vehicles are provided with an auto park feature, also referred to as return-to-park feature. The purpose of the auto park feature is to shift the vehicle transmission into park position automatically when certain conditions are met so as to keep the vehicle stationary under the conditions. Non limiting examples of conditions where the vehicle transmission is driven into park position automatically are, for example, when a person intends to exit the car, when the vehicle is turned off, when the ignition key has been removed, when a vehicle door is open, when a safety belt is unlatched, etc. When at least one of the conditions is detected, the vehicle transmission is driven into park position automatically and, at the same time, the rotary actuator is driven by an electric motor into park such that the driver is aware that the auto park feature is being activated.

Users are thus given an extra safety function ensuring that, under the condition, the vehicle transmission will remain always in park, that is, in a brake position, even if the driver forgets to turn the rotary actuator into park before leaving the car. As a result, damages to the car, to other vehicles, or to people, animals, objects, etc. are avoided.

However, a disadvantage is still associated with such known rotatable selector mechanisms with auto park feature that is related to the complexity of the gearshift mechanism. An electric motor is required for driving the rotary actuator into park when at least one of the above mentioned conditions is detected. This adds manufacturing and operating complexity to the vehicle shift-by-wire assembly, and therefore adds cost. As a result, in known rotatable selector mechanisms, specifically of the multi-stable type with auto park feature, when the auto park feature is activated, asynchronisms between the electric motor of the rotary actuator and the transmission may occur due the end of travel members that are provided in the gear shift assembly.

SUMMARY

It is an object of the present disclosure to provide an improved shift by wire gear shift actuator with which the above problems are overcome or at least minimized. A shift by wire gear shift device comprising the wire gear shift actuator and a method for informing that a vehicle transmission is being automatically driven into a park gearshift position when a determined condition is met are also disclosed herein.

According to a first aspect of the present disclosure, a shift by wire gear shift actuator is provided comprising a selector knob. The selector knob is of the type that is rotatable between a number of angular positions corresponding to different gearshift positions. Specifically, the selector knob is rotatable by the user for selecting one of a number of gearshift positions such as Park (P), Reverse (R), Neutral (N) and Drive (D) for controlling a vehicle transmission. Other gearshift positions are of course possible.

The selector knob may be of the multi-dial type, that is, the selector knob can be freely rotated in any direction so as to select one from a number of gearshift positions for controlling a vehicle transmission, the number of gearshift positions are not predefined as they are software-varied over time.

In other cases, the selector knob may be of the monostable type, that is, capable of being rotated from a starting position to a switching position and automatically returning back to the starting position when one of a number of gearshift positions for controlling a vehicle transmission is selected.

The present shift-by-wire gear shift actuator further comprises a display arrangement. The display arrangement may be of any suitable type to display information, inter alia, concerning the auto park feature. More specifically, the display arrangement is associated with the selector knob and the display arrangement is configured for sequentially and dynamically providing optical indications according to the gearshift positions. The optical indications that are sequentially and dynamically provided to the user correspond to gearshift positions in which the transmission has to be driven until reaching park.

According to another feature of the present shift-by-wire gear shift actuator, the optical indications are provided sequentially and dynamically by the display arrangement such that a rotational movement of the selector knob is simulated so as to inform the user that the vehicle transmission is being automatically driven into park when a determined condition is met, that is, that the auto park feature is being activated. This occurs regardless of whether the selector knob is being actuated by the driver, that is, the selector knob may not be driven but the display arrangement still provides optical indications sequentially and dynamically to the user simulating a rotational movement of the selector knob. The user is thus informed that the vehicle transmission is being automatically driven into park.

With the display arrangement, an electric motor for driving the actuator is no longer necessary. Complexity and thus costs are advantageously reduced as compared to known shift-by-wire gear shift devices.

A further advantage is that asynchronisms related to the transmission are also avoided since when the vehicle transmission is driven automatically into park, the shift-by-wire gear shift actuator is software-driven also into park. Specifically, since, according to the present disclosure, the selector knob is not driven by a motor as in prior art gearshift devices during the auto park feature, when the vehicle transmission is driven automatically into park, the shift-by-wire gear shift actuator is software-driven also into park. In that way, both the vehicle transmission and the gear shift actuator are synchronized. When the driver desires to actuate the vehicle gear shift afterwards in order to drive the vehicle again, the gear shift actuator will be always be in park after the condition occurred, for example, after leaving the car, when getting into the car again.

Although it is not necessary, the user may be informed about the gearshift positions the vehicle transmission until reaching park. For this purpose, the display arrangement may further include a gearshift display for showing gearshift positions.

When a given condition is detected, for example, by sensors installed in the vehicle, a central unit outputs a signal to drive the vehicle transmission automatically into park, but the selector knob is not driven, that is, the selector knob remains stationary. The user is however informed that the vehicle transmission is being automatically driven into park under the above mentioned condition.

The condition, under which the vehicle transmission is automatically driven into a park gearshift position and optical indications are sequentially and dynamically provided by the display arrangement simulating a rotational movement of the selector knob, is at least one selected from when a person intends to exit the car, when the vehicle is turned off, when the ignition key has been removed, when a vehicle door is open, when a safety belt unlatched, etc.

Conveniently, the display arrangement may comprise a number of display units located on the selector knob arranged to be sequentially switched on according to different gearshift positions until reaching park when the auto park feature is activated. The display units may be separate display units or they may be part of a continuous display unit and are arranged and configured to simulate a rotational movement of the selector knob, although it is stationary, so that the user is informed that the vehicle transmission is being automatically driven into park.

One example of the display arrangement may include a progress band located on the selector knob arranged for sequentially displaying different gearshift positions. Other arrangements are not ruled out as long as they simulate a rotational movement of the selector knob. The display units may be arranged surrounding the selector knob, for example, on the periphery of the selector knob. It may be preferred that the display arrangement comprises a number of LCD display units. Other display arrangements are also possible such as LEDs or the like as long as the user is appropriately informed that the auto park feature is being activated as stated above.

According to a second aspect of the present disclosure, a shift by wire shifter device for motor vehicles is also disclosed herein. The shift by wire shifter device may include a housing and a bezel covering the housing. The shift by wire shifter device further includes an arrangement for automatically driving a vehicle transmission into a park gearshift position when a determined condition is met. Such a determined condition may be, for example, at least one selected from: when a person intends to exit the vehicle, when the vehicle is turned off, when the ignition key has been removed, when a vehicle door is open, when a safety belt is unlatched. The shift by wire shifter device includes the above described shift by wire gear shift actuator. The selector knob of the actuator may be rotatable mounted to the bezel. The display arrangement in this case may be arranged on the periphery of the bezel. The display units may be thus still arranged surrounding the selector knob but placed on the bezel.

According to a third aspect of the present disclosure, a method for informing that a vehicle transmission is being automatically driven into a park gearshift position when a determined condition is met is also described herein. The determined condition may be for example at least one selected from: when a person intends to exit the vehicle, when the vehicle is turned off, when the ignition key has been removed, when a vehicle door is open, when a safety belt is unlatched.

The method comprises detecting a gearshift position of the vehicle transmission such as Park (P), Reverse (R), Neutral (N), Drive (D), etc. The method also comprises detecting the above mentioned determined condition.

When it is determined, for example by sensors installed in a vehicle, that the vehicle is in the condition and the transmission is not in park, the auto park feature is activated. This means that the vehicle transmission is driven automatically into park from the current gearshift position. At the same time, the shift by wire gear shift actuator is software-driven also into park while the selector knob stands still in position. The remainder gearshift positions are re-arranged accordingly.

Then optical information is determined to be dynamically provided according to different gearshift positions. The optical information to be dynamically provided simulates a rotational movement of a selector knob until the park gearshift position is reached. The method further comprises displaying the optical information through the above mentioned shift by wire gear shift actuator.

Although, as stated above, the selector knob stands still in position during auto park feature, it may be locked, for example, via a brake coil, when it is in park. Then, when the user desires to drive the vehicle again, a combination of at least two actions has to be performed in order to unlock the vehicle transmission out of the park gearshift position.

The order of the above steps can be of course different.

Additional objects, advantages and features of examples of the present shift by wire gear shift actuator will become apparent to those skilled in the art upon examination of the description, or may be learned by practice thereof.

BRIEF DESCRIPTION OF THE DRAWINGS

Particular embodiments of the present shift by wire gear shift actuator, a shift by wire shifter device comprising the gear shift actuator and a method for informing that a vehicle transmission is being automatically driven into a park gearshift position will be described in the following by way of non-limiting examples, with reference to the appended drawings, in which.

DETAILED DESCRIPTION

Figure 1:
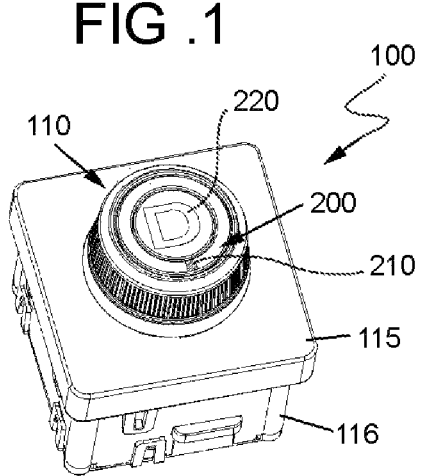
FIGS. 1 to 9 are general perspective views of one example of a shift by wire gear shift actuator according to the present disclosure, which has been illustrated in different gearshift positions P, R, N, D during activation of the auto park feature until the park gearshift position has been reached.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

By way of example, a shift by wire gear shift actuator for controlling a motor vehicle transmission, denoted as a whole with reference numeral 100, is illustrated in the figures. The actuator 100 may be part of a shift by wire shifter device having an auto park feature for automatically driving the vehicle transmission into a park gearshift position when a determined condition is met as it will be explained herein below.

Figure 2:
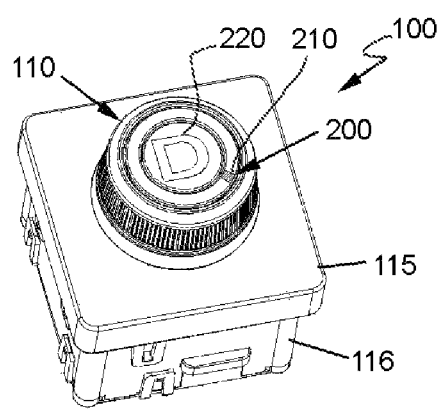
Figure 3:
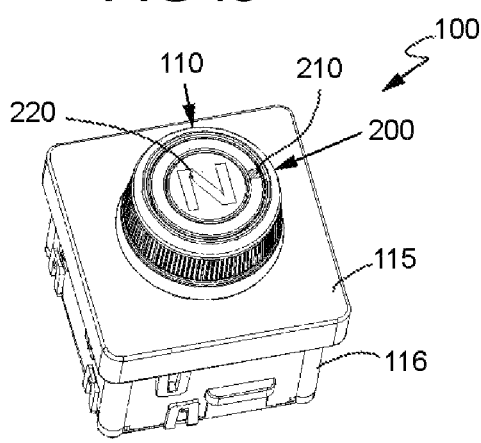
Figure 4:
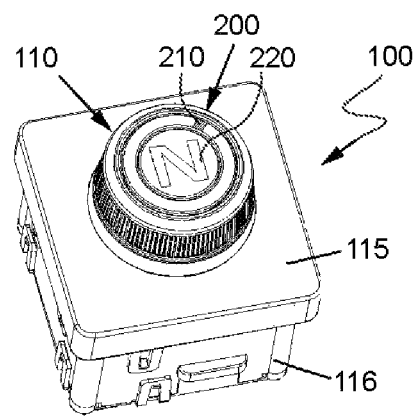
Figure 5:
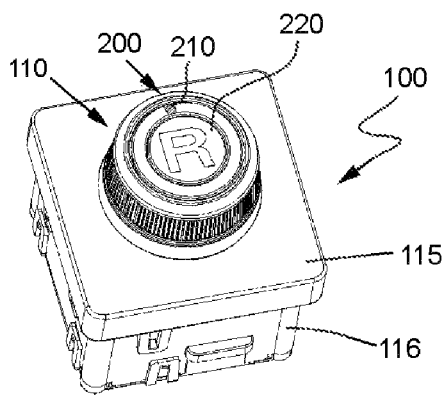
Figure 6:
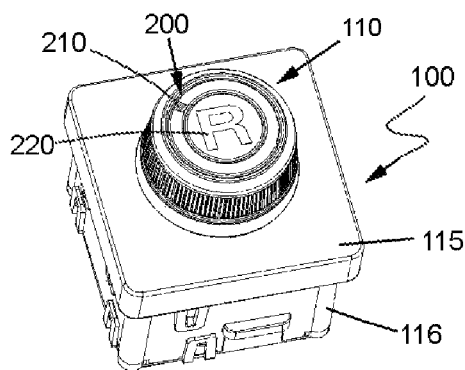
Figure 7:
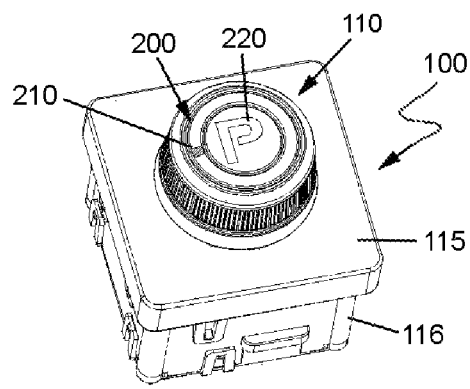
Figure 8:
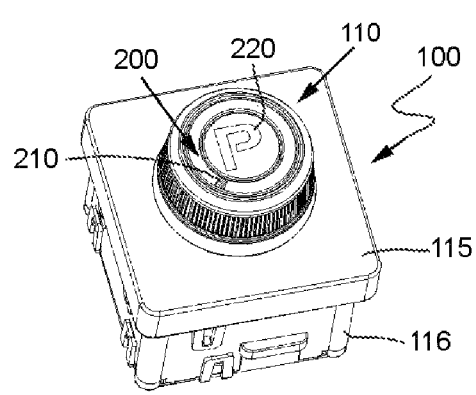
Figure 9:
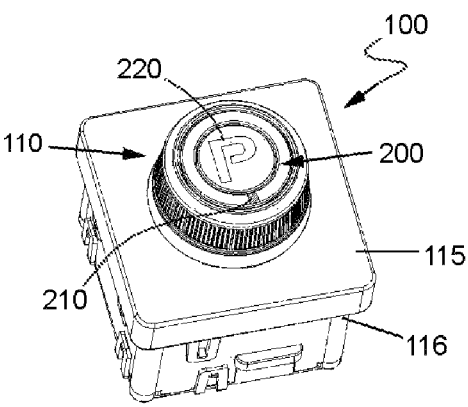

Specifically, the shift by wire gear shift actuator 100 in the example shown in the FIGS. 1-9 is part of a rotary multi-dial shifter and comprises a selector knob 110, a bezel 115, and a housing 116. The selector knob 110 is rotatable mounted on the bezel 115 in the housing 116. Thus, the selector knob 110 is rotatable for selecting one of a number of gearshift positions such as Park (P), Reverse (R), Neutral (N) and Drive (D) for controlling a vehicle transmission.

According to the example shown, the shift by wire gear shift actuator 100 includes a display arrangement 200. The display arrangement 200 is associated with the selector knob 110 as it will be discussed further below. The display arrangement 200 comprises a number of liquid crystal display ("LCD") display units 210 located surrounding the selector knob 110, that is, radially distributed on the periphery thereof, as shown in the figures of the drawings. Other display arrangements are also possible such as light emitting diodes ("LEDs") or the like as long as the user is appropriately informed that the auto park feature is being activated as stated above. In any case, the display units 210 may be configured to provide continuous light, blinking light, flashing light and combinations thereof. The display units 210 may be configured in the form of a cursor or be a continuous lighting strip.

In the example shown, the display units 210 operate such that they are switched on in succession as the auto park feature is activated for sequentially and dynamically providing optical indications according to the gearshift positions (P, R, N, D). This provides the user with effect of rotational movement of the selector knob 110, although the selector knob 110 stands still, when the auto park feature is activated, that is, when the vehicle transmission is being automatically driven into park P, for example when a person intends to exit the vehicle, when the vehicle is turned off, when the ignition key has been removed, when a vehicle door is open, when a safety belt is unlatched, etc.

An LCD gearshift display 220 is also provided for displaying the current gear to the user. The LCD gearshift display 220 is arranged at the center of the upper portion of the selector knob 110. However, the gearshift display 220 may be arranged in other locations such as for example, the bezel 115 or even on the dashboard of the vehicle.

The wire gear shift actuator 100 operates as follows. When a given condition is detected, for example by sensors installed in a vehicle, such as for example when a person intends to exit the vehicle, when the vehicle is turned off, when the ignition key has been removed, when a vehicle door is open, when a safety belt is unlatched, etc., a central unit outputs a signal to drive the vehicle transmission into park P from the current gearshift position while, at the same time, the shift by wire gear shift actuator 100 is software-driven also into park P and the selector knob 100 stands still in position. Also, with the selector knob 110 stood still in position, that is, without rotating, the display units 210 are switched on in succession around the selector knob 110 (see display units 210 in the form of cursors switching on and off alternatively around the selector knob 110 in FIGS. 1-9 of the drawings) while the gear shift position displayed by the gearshift display 220 is changed sequentially from one gearshift position to another as also shown in FIGS. 1-9 of the drawings. This provides the user with an optical effect that the selector knob 110 is rotated returning back to park P from the last gear shift position.

A method is also described to warn the user that the auto park feature of the vehicle transmission is being activated. The purpose of the method is to inform the user that the vehicle transmission is being automatically driven into a park gearshift position P when a determined condition is met, such as for example when a person intends to exit the vehicle, when the vehicle is turned off, when the ignition key has been removed, when a vehicle door is open, when a safety belt is unlatched, as described above.

The method comprises detecting a gearshift position of the transmission such as Park (P), Reverse (R), Neutral (N) and Drive (D), for example, via sensors installed in the shift by wire gear shift actuator 100. According to the method, the above mentioned determined condition is detected, for example via sensors installed in the vehicle. If the determined condition is detected and the vehicle transmission is detected not to be in park P, optical information is then determined to be dynamically displayed to the user according to the different gearshift positions of the selector knob 110 before reaching the park gearshift position P, between the current gearshift position and park. This may include, for example, determining illumination displaying guidance trace for the actuator 100. When park P has been reached, the selector knob 110 is automatically locked in position.

In any case, the optical information displayed to the user has the effect of simulating a rotational movement of the selector knob 110 until reaching park P. Finally, the optical information is displayed to the user through the above described display units 210 in the display arrangement 200.

Although only a number of particular embodiments and examples of the present shift by wire gear shift actuator, the gear shift device including the actuator, and the method to inform the user about the auto park feature in the gear shift device, have been disclosed herein, it will be understood by those skilled in the art that other alternative examples and/or uses and obvious modifications and equivalents thereof are also possible. The present disclosure covers all possible combinations of the particular examples described. Thus, the scope of the present disclosure should not be limited by particular examples, but should be determined only by a fair reading of the claims that follow.

What is claimed is:
1. A shift by wire gear shift actuator comprising:
a selector knob rotatable for selecting one of a plurality of gearshift positions among at least Park (P), Reverse (R), Neutral (N), and Drive (D) gearshift positions for controlling a vehicle transmission; and
a display arrangement associated with the selector knob comprising a plurality of display units arranged to be sequentially on according to the plurality of gear positions for sequentially and dynamically providing optical indications according to the plurality of gearshift positions having the effect of simulating a rotational movement of the selector knob informing a user that the vehicle transmission is being automatically driven into the Park (P) gearshift position when a determined condition is met.

2. The actuator of claim 1, wherein the plurality of display units is located on the selector knob.

3. The actuator of claim 2, wherein the plurality of display units are separate display units.

4. The actuator of claim 1, wherein the display arrangement comprises a progress band located on the selector knob arranged for sequentially displaying different gearshift positions.

5. The actuator of claim 1, wherein the display arrangement is arranged surrounding the selector knob.

6. The actuator of claim 1, wherein the display arrangement is arranged on a periphery of the selector knob.

7. The actuator of claim 1, wherein the condition, under which the vehicle transmission is automatically driven into the Park (P) gearshift position and optical indications are sequentially and dynamically provided by the display arrangement simulating the rotational movement of the selector knob is at least one selected from: when a person intends to exit the vehicle, when the vehicle is turned off, when an ignition key has been removed, when a vehicle door is open, and when a safety belt is unlatched.

8. The actuator of claim 1, wherein the selector knob is of a multi-dial type or of a monostable type.

9. The actuator of claim 1, wherein the display arrangement further includes a gearshift display for displaying a current gearshift position.

10. A shift by wire shifter device for motor vehicles including an arrangement for automatically driving a vehicle transmission into a park gearshift position when the determined condition is met, wherein the shift by wire shifter device further comprises the shift by wire gear shift actuator according to claim 1.

11. The device of claim 10 comprising a bezel and the selector knob is rotatable mounted to the bezel and the display arrangement is arranged on a periphery of the bezel.

12. The device of claim 10, wherein the determined condition is at least one selected from: when a person intends to exit the vehicle, when the vehicle is turned off, when an ignition key has been removed, when a vehicle door is open, and when a safety belt is unlatched.

13. A method for informing that a vehicle transmission is being automatically driven into a Park (P) gearshift position when a determined condition is met, the method comprising:
    detecting a gearshift position,
    detecting the determined condition,
    determining optical information to be dynamically provided via a plurality of display units, according to different gearshift positions simulating a rotational movement of a selector knob until the Park (P) gearshift position is reached, and
    displaying, via the plurality of display units, the optical information through a shift by wire gear shift actuator when the vehicle is in the condition and the transmission is not in park.

14. The method of claim 13 further comprises locking the selector knob of the shift by wire gear shift actuator when the park gearshift position has been reached.

15. The method of claim 13, wherein the determined condition is at least one selected from: when a person intends to exit the vehicle, when the vehicle is turned off, when an ignition key has been removed, when a vehicle door is open, and when a safety belt is unlatched.

16. A shift by wire gear shift actuator comprising:
    a selector knob rotatable to select one of a plurality of gearshift positions among at least Park (P), Reverse (R), Neutral (N), and Drive (D) gearshift positions for controlling a vehicle transmission; and
    a display arrangement associated with the selector knob comprising a plurality of display units arranged to be sequentially on according to the plurality of gear positions to sequentially provide optical indications according to the plurality of gearshift positions having the effect of simulating a rotational movement of the selector knob to inform a user that the vehicle transmission is being automatically driven into the Park (P) gearshift position when a determined condition is met.

17. The actuator of claim 16, wherein the display arrangement comprises a number of display units located on the selector knob arranged to be sequentially switched on according to different gearshift positions.

18. The actuator of claim 17, wherein the number of display units are separate display units.

19. The actuator of claim 16, wherein the display arrangement comprises a progress band located on the selector knob arranged for sequentially displaying different gearshift positions.

20. The actuator of claim 16, wherein the condition, under which the vehicle transmission is automatically driven into the park gearshift position and optical indications are sequentially and dynamically provided by the display arrangement simulating the rotational movement of the selector knob is at least one selected from: when a person intends to exit the vehicle, when the vehicle is turned off, when an ignition key has been removed, when a vehicle door is open, and when a safety belt is unlatched.

* * * * *